US009944219B2

United States Patent
Lakatos et al.

(10) Patent No.: US 9,944,219 B2
(45) Date of Patent: Apr. 17, 2018

(54) HEADLAMP MODULE SLIP PLANE BRACKET

(71) Applicant: Ford Global Technologies, LLC, Dearborn, MI (US)

(72) Inventors: Steven Michael Lakatos, Waterford, MI (US); Stuart Cibulka, Birmingham, MI (US); Irfan Sharif, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 14/944,413

(22) Filed: Nov. 18, 2015

(65) Prior Publication Data

US 2017/0136938 A1 May 18, 2017

(51) Int. Cl.
*B60Q 1/04* (2006.01)
*B62D 65/16* (2006.01)

(52) U.S. Cl.
CPC ........... *B60Q 1/0483* (2013.01); *B60Q 1/045* (2013.01); *B60Q 1/0441* (2013.01); *B62D 65/16* (2013.01)

(58) Field of Classification Search
CPC ...... B62D 25/084; B62D 65/04; B62D 65/16; B60Q 1/0433; B60Q 1/0425; B60Q 1/045; B60Q 1/0458; B60Q 1/068; B60Q 1/0683; B60Q 1/18
USPC ...... 296/193.09, 193.1, 203.02; 33/288, 335, 33/372; 424/85.4, 85.6, 85.7
See application file for complete search history.

(56) References Cited

U.S. PATENT DOCUMENTS

| | | |
|---|---|---|
| 5,408,391 A | 4/1995 | Denley |
| 5,639,155 A | 6/1997 | Kowall et al. |
| 5,788,363 A | 8/1998 | Kamaya et al. |
| 6,386,624 B1 | 5/2002 | Schultz et al. |
| 6,523,886 B2 | 2/2003 | Hoffner et al. |
| 6,923,495 B2 * | 8/2005 | Kishikawa ........... B60Q 1/0425 180/68.4 |
| 6,969,184 B2 | 11/2005 | Bergman et al. |

(Continued)

FOREIGN PATENT DOCUMENTS

CN 1562684 A 1/2005

OTHER PUBLICATIONS

Headlight Bracket used on Ford Motor Company North American Edge, Feb. 2015.

*Primary Examiner* — D Glenn Dayoan
*Assistant Examiner* — Sunsurraye Westbrook
(74) *Attorney, Agent, or Firm* — Jason Rogers; Brooks Kushman P.C.

(57) ABSTRACT

A slip plane bracket for a front end sub-assembly of a vehicle and method of assembling the front end of the vehicle is disclosed. The slip plane bracket attaches a headlamp module to a bolster at a front end of a vehicle to facilitate adjustment of the headlamp module location relative to the front fascia, headlamps and grille. Headlamp modules are assembled to a bolster through a slip plane bracket interface that is adjustable in X (longitudinal) and Y (lateral) directions to achieve improved fit relative to adjacent modules. According to the method, a pair of headlamp modules is attached to the bolster with an adjustable fastener to set the height of the modules. Slip plane brackets are assembled to tabs provided on the headlamp modules and the location of the slip plane brackets is adjusted in a longitudinal plane and a lateral plane.

17 Claims, 3 Drawing Sheets

(56) References Cited

U.S. PATENT DOCUMENTS

| | | | |
|---|---|---|---|
| 8,567,853 B2 * | 10/2013 | Huber | B60R 19/24 |
| | | | 293/120 |
| 8,720,975 B1 * | 5/2014 | Perez | B60Q 1/0491 |
| | | | 296/187.04 |
| 8,801,056 B2 * | 8/2014 | Herve | B60Q 1/0441 |
| | | | 293/1 |
| 9,539,934 B2 * | 1/2017 | Fortin | B60R 19/023 |
| 2005/0088015 A1 | 4/2005 | Kishikawa et al. | |

* cited by examiner

HEADLAMP MODULE SLIP PLANE BRACKET

TECHNICAL FIELD

This disclosure relates to a slip plane bracket for assembling a headlamp module to a front end bolster that is assembled as a sub-assembly to a vehicle.

BACKGROUND

Vehicle manufacturers strive to improve the quality of vehicles by reducing tolerances and improving fit and finish. Assembly of the front end of a vehicle involves assembling together multiple components such as the front fascia, headlamps, grille, and the like. Manufactured parts are made within tolerances but assembling multiple parts together is subject to tolerance stack-up that can lead to unsatisfactory fit and finish.

Service operations for repairing damage to the front end of a vehicle may also be adversely affected if the sheet metal replacement parts are not made to exact tolerances. Variation in part sizes and shapes may impact the final appearance of the vehicle after repair.

This disclosure is directed to the above problems and other problems as summarized below.

SUMMARY

A slip plane bracket is disclosed that attaches a headlamp module to a front end of a vehicle to facilitate adjustment of the headlamp module location relative to the front fascia, headlamps, grille and other parts of the vehicle. The quality of the fit and finish of a vehicle is improved by eliminating tolerance paths. Headlamp modules are assembled to a bolster through a slip plane bracket interface that is adjustable in X (longitudinal) and Y (lateral) directions to achieve improved fit relative to adjacent modules.

The slip plane bracket benefits assembly operations because it allows the headlamp modules to be adjusted after assembly to improve fit with parts that may be subject to tolerance stack-up within a body build.

The slip plane bracket also facilitates repair of a vehicle that is damaged in the front end in a collision. The ability to adjust the headlamp module position in a service procedure as repair parts are assembled can compensate for variations in the position of adjacent parts and modules.

According to one aspect of this disclosure, a slip plane bracket is provided that comprises a body portion, a ramp and a retainer flange. The body portion defines a clearance hole generated about a Y axis. (As used herein X refers to the longitudinal direction, Y refers to the lateral direction, and Z refers to the vertical direction.) The ramp includes a planar upper surface facing an upper, forward and laterally outboard direction. The ramp has a bottom edge located above a top surface of the body portion. The retainer flange has a lower edge spaced from and parallel to the bottom edge of the ramp that flexes toward and away from the bottom edge.

According to another aspect of this disclosure as it relates to the slip plane bracket, the body portion, ramp, and retainer flange may be molded in the form of a monolithic structure.

The slip plane bracket may further comprise an anti-rotation flange extending in a Y direction and a Z direction. A self-tapping fastener may be inserted into the anti-rotation flange with an axis oriented to extend in the Y direction.

According to another aspect of this disclosure a vehicle front end sub-assembly is disclosed. The sub-assembly includes a pair of headlamp modules attached to a bolster by an adjustable fastener establishing a Z position for the headlamp modules. A tab extending below the headlamp modules is received by a pair of slip plane brackets. An alignment fastener is inserted in a clearance hole defined by each slip plane bracket establishing an X and Y position. An anti-rotation fastener is inserted through an anti-rotation flange of each slip plane bracket.

According to other aspects of this disclosure as it relates to the vehicle front end sub-assembly, the slip plane bracket may further comprise a body portion defining the clearance hole that is generated about a Y axis. A ramp includes a planar upper surface and has a bottom edge located above a top surface of the body portions. Retainer flanges having a lower edge spaced from and parallel to the bottom edge of the ramps and may be flexed toward and away from the bottom edge. The retainer flanges may be attached to riser flanges by living hinges that facilitate bending the retainer flanges toward and away from the bottom edge of the ramps.

The anti-rotation flanges may extend in the Y direction and the Z direction. The anti-rotation fasteners may be self-tapping fasteners received by the anti-rotation flanges that are oriented to extend parallel to the Y axis.

According to another aspect of this disclosure, a method is disclosed for assembling a front end sub-assembly for a vehicle. The method begins by assembling a pair of headlamp modules to a bolster in a fixture. The headlamp modules are attached to the bolster with adjustable fasteners to set a height of the modules. Next, first and second slip plane brackets are assembled to first and second tabs that are provided on the headlamp modules for adjusting a location of the slip plane brackets longitudinally and laterally. The slip plane brackets are assembled to the bolster with an alignment fastener and an anti-rotation fastener.

According to other aspects of this disclosure as it relates to the method, the slip plane brackets may each define an alignment hole and the step of fastening the slip plane bracket to the bolster may further comprise securing the alignment fastener in the alignment hole to fix the location of the slip plane bracket in longitudinal and lateral planes. The slip plane brackets may each include an anti-rotation flange and the anti-rotation fastener may be a self-tapping fastener. The step of fastening the slip plane bracket to the bolster may further comprise securing the anti-rotation flange to the bolster with the self-tapping fastener to prevent rotation of the slip plane bracket relative to the bolster.

According to other aspects of the method, the slip plane brackets may include: a body portion defining a clearance hole generated about a Y axis; a ramp including a planar upper surface and having a bottom edge spaced above a top surface of the body portion; and a retainer flange having a lower edge spaced from and parallel to the bottom edge of the ramp that flexes toward and away from the bottom edge. The step of assembling the slip plane brackets to the flanges provided on the headlamp modules may further comprise sliding the first and second flanges of the headlamp modules between the bottom edge of the ramp and the lower edge of the retainer flange of the slip plane brackets.

The step of fastening the slip plane brackets may further comprise securing the alignment fastener in an alignment hole to fix the location of the slip plane bracket longitudinally and laterally. The step of fastening the slip plane brackets may further comprise securing the anti-rotation flange to the bolster with the anti-rotation fastener to prevent rotation of the slip plane bracket relative to the bolster.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
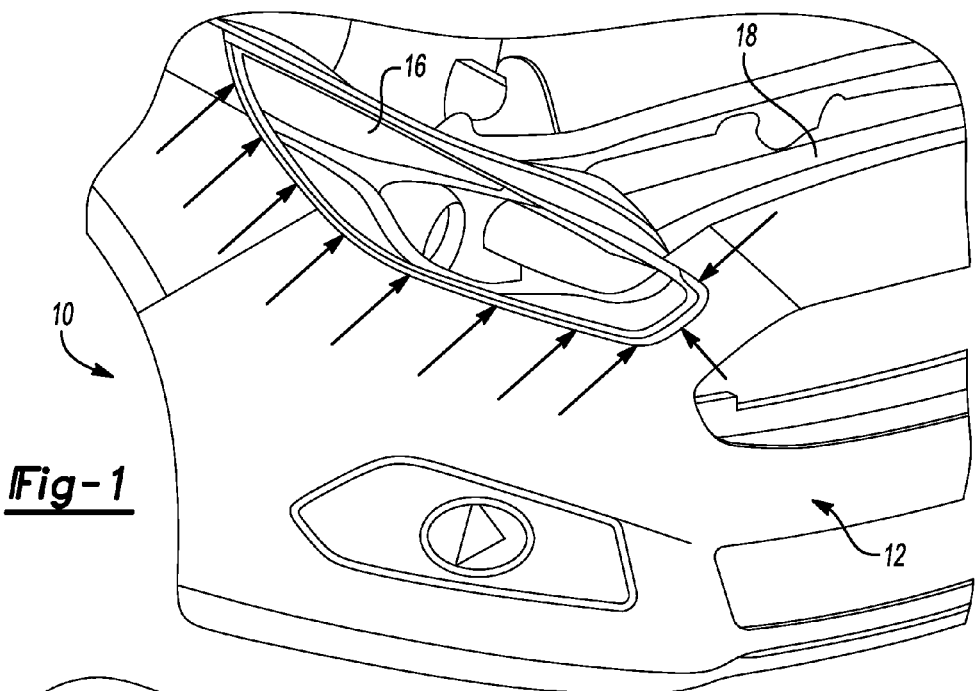
FIG. 1 is a fragmentary front/right side perspective view of a portion of a front end of a vehicle.

Referring to FIG. 1, a vehicle 10 is partially illustrated. The vehicle 10 includes a front end 12 that is adapted to receive a headlamp module 16. A pair of headlamp modules 16 are attached to opposite ends of a bolster 18.

Referring to FIGS. 2-5, a slip plane bracket 20 is adapted to receive a headlamp 1 mounting tab (or flange) 24. An alignment fastener 26 is received in an alignment hole 28 defined by the slip plane bracket 20. The alignment hole 28 may also be referred to as a clearance hole because there are several millimeters of clearance around the alignment fastener 26 that facilitates aligning the slip plane bracket 20 when it is attached to the bolster 18. A mounting hole is defined by the bolster 18 that receives the alignment fastener 26.

An anti-rotation fastener 30 (shown in FIG. 2) is used to attach an anti-rotation flange 32 to the bolster 18 to prevent rotation of the slip plane bracket 20 about the alignment fastener 26. The anti-rotation flange 32 defines a hole 34 in which the anti-rotation fastener 30 is received. Anti-rotation fastener 30 penetrates the bolster 18 and taps a screw thread in the bolster 18 when inserted through the hole 34 and driven into the bolster 18.

The slip plane bracket 20 includes a body portion 36 through which the clearance hole 28 is formed. The slip plane bracket 20 includes a ramp 40 that includes an upper surface 42. The headlamp mounting tap 24 is received on the upper surface 42 of the ramp 40 when the slip plane bracket 20 is assembled to the bolster 18. The slip plane bracket 20 also includes a retainer flange 44 that is spaced from a bottom edge 46 of the ramp 40.

Figure 3:
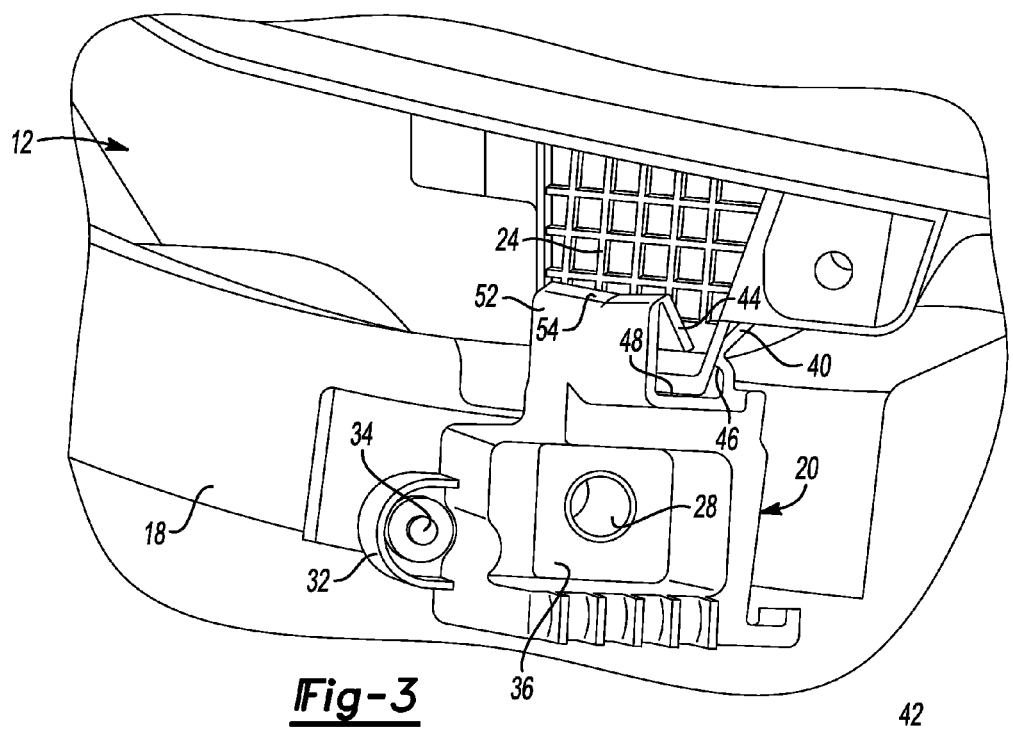
FIG. 3 is a perspective view of the bolster, the headlamp module, the slip plane bracket and fasteners assembled together to form the front end sub-assembly
Figure 4:
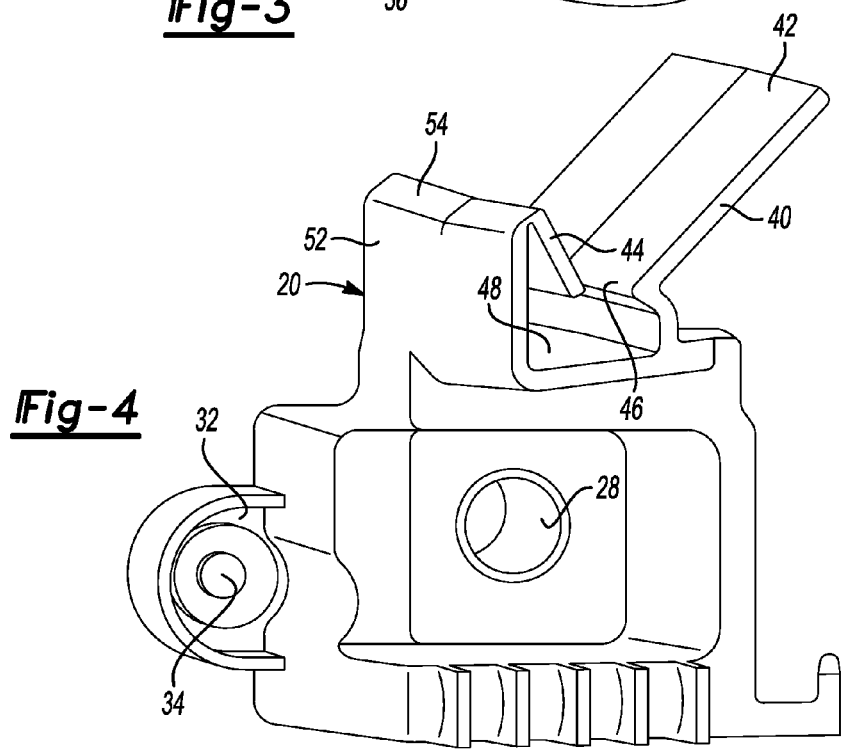
FIG. 4 is a front perspective view of the slip plane bracket.
Figure 5:
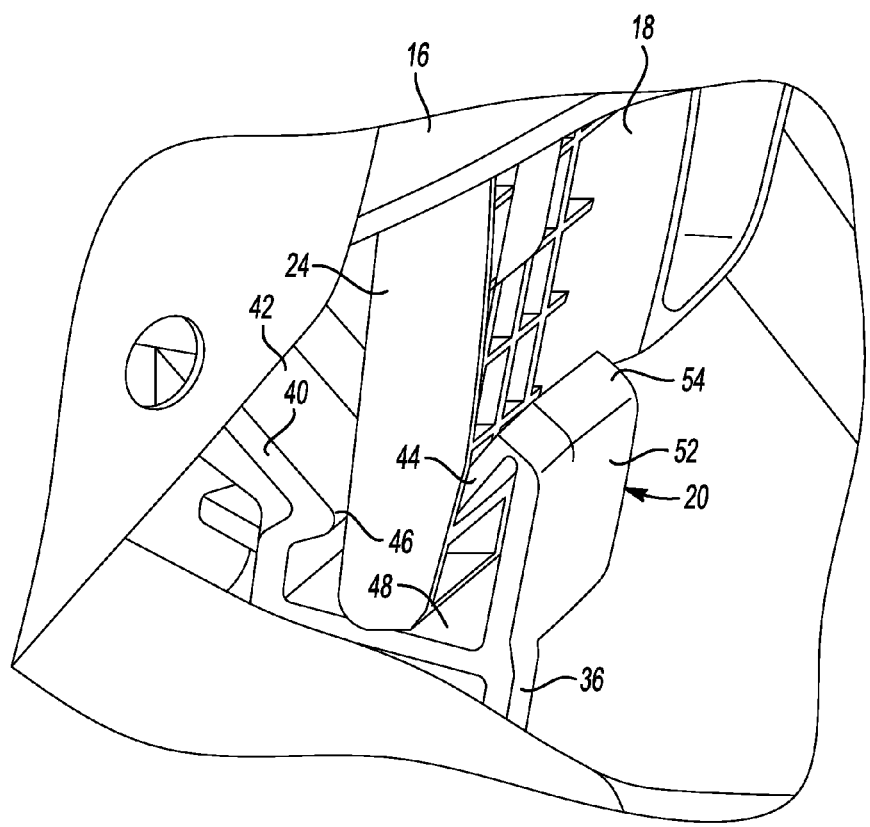
FIG. 5 is a fragmentary side perspective view of the tab of the headlamp module received by the slip plane bracket.

Referring to FIGS. 3-5, the body portion 36 of the slip plane bracket 20 includes a top surface 48. The headlamp mounting tab 24 is inserted in the slip plane bracket 20 until the headlamp mounting tab 24 is disposed adjacent the top surface 48. The retainer flange 44 is supported by a riser flange 52 that extends from the top surface 48 of the body portion 36. A living hinge 54 is provided between the riser flange 52 and the retainer flange 44. The living hinge 54 is provided to facilitate bending the retainer flange 44 relative to the riser flange 52 and the bottom edge 46 of the ramp 40.

Figure 2:
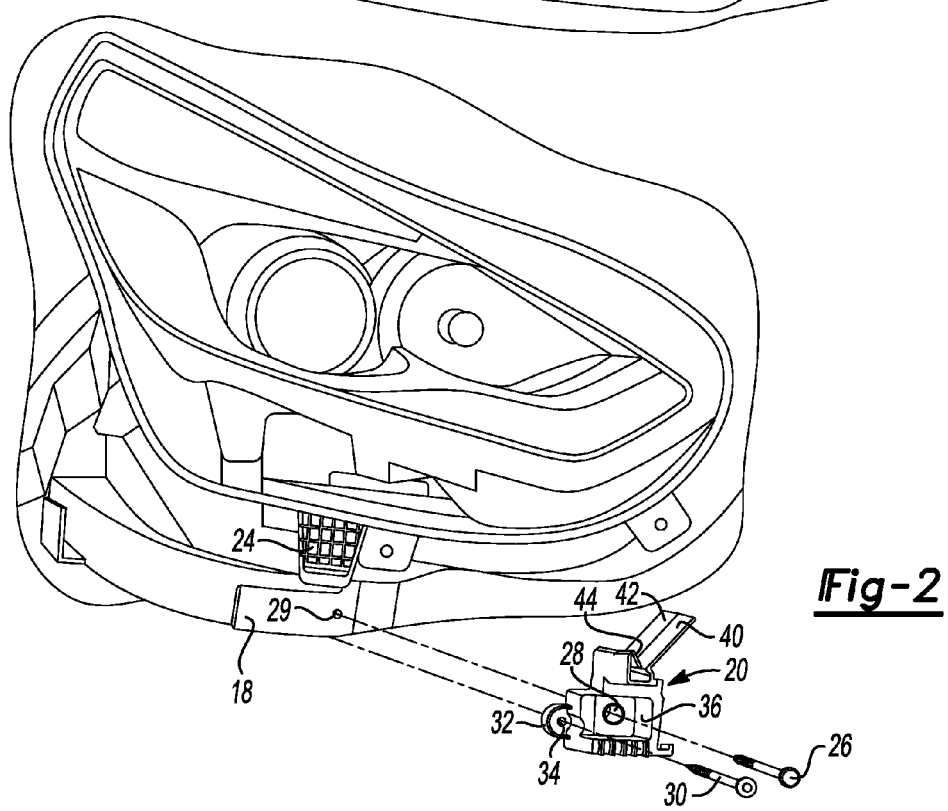
FIG. 2 is an exploded perspective view of a bolster, a headlamp module, a slip plane bracket and fasteners that comprise the front end sub-assembly.

Referring specifically to FIG. 2, the slip plane bracket 20 is shown to be exploded away from the bolster 18 for illustration purposes.

The method of assembling a front end sub-assembly 12 for a vehicle 10 comprises the steps of assembling a pair of headlamp modules 16 to a bolster 18 in a fixture. The headlamp modules 16 are then attached to the bolster 18 with alignment fasteners 26 to set the height of the modules 16. The first and second slip plane brackets 20 are then assembled to first and second headlamp mounting tabs 24 that are provided on each one of the headlamp modules 16. The location of the slip plane brackets 20 are then adjusted in a longitudinal plane and a lateral plane. The slip plane brackets 20 are then fastened to the bolster 18 with an alignment fastener 26 and an anti-rotation fastener 30.

The slip plane brackets 20 each define an alignment hole 28 and the step of fastening the slip plane bracket 20 to the bolster 18 is performed by securing the alignment fastener 26 in the alignment hole 28 to fix the location of the slip plane bracket 20 in the longitudinal plane and the lateral plane. The slip plane brackets 20 each include the anti-rotation flange 32 and the anti-rotation fastener 30 that is a self-tapping fastener. The anti-rotation flange 32 is fastened to the bolster 18 with the self-tapping fastener 30 to prevent rotation of the slip plane bracket 20 relative to the bolster 18.

The method may also include sliding the first and second flanges 24 of the headlamp modules 16 between the bottom edge 46 of the ramp 40 and the lower edge of the retainer flange 44. The slip plane brackets 20 include the body portion 36 defining the clearance hole 28 generated about a Y axis, the ramp 40 including the planar upper surface 42. The bottom edge 46 of the ramp 40 is spaced above the top surface 48 of the body portion 36. The retainer flange 44 has a lower edge spaced from and parallel to the bottom edge 46 of the ramp 40 that flexes toward and away from the bottom edge 46. The step of assembling first and second slip plane brackets 20 to the flanges 24 provided on the headlamp modules 20 comprises sliding the first and second flanges 24 of the headlamp modules 16 between the bottom edge 46 of the ramp 40 and the lower edge of the retainer flange 44 of the slip plane brackets 20.

According to the method, the alignment fastener 26 is secured in an alignment hole 28 to fix the location of the slip plane bracket 20 in the longitudinal plane and the lateral plane. The anti-rotation flange 32 is secured to the bolster 18 by the anti-rotation fastener 30 to prevent rotation of the slip plane bracket 20 relative to the bolster 18.

Finally, the method also features the step of molding the slip plane brackets 20 in one piece. The slip plane bracket 20 is molded from a rigid and durable polymer in an injection molding process.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A slip plane bracket for aligning a headlamp comprising:
   a body portion defining a clearance hole;
   a ramp including a planar upper surface oriented to lie in an upper, forward and laterally outboard plane and having a bottom edge above a top surface of the body portion; and a retainer flange having a lower edge spaced from and parallel to the bottom edge of the ramp that flexes toward and away from the bottom edge.

2. The bracket of claim 1 wherein the body portion, ramp, and retainer flange are a monolithic structure.

3. The bracket of claim 1 further comprising:
an anti-rotation flange extending in a Y direction and a Z direction; and
a self-tapping fastener received by the anti-rotation flange and oriented to extend parallel to an X axis.

4. The bracket of claim 3 wherein the body portion, ramp, retainer flange and anti-rotation flange are a monolithic structure.

5. A vehicle front end comprising:
a pair of headlamp modules attached to a bolster;
a pair of slip plane brackets attached to a tab extending below the headlamp modules, the slip plane brackets each including a ramp including a planar upper surface oriented to lie in an upper, forward and laterally outboard plane;
an alignment fastener inserted in a clearance hole defined by each slip plane bracket establishes an X and Y position; and
an anti-rotation fastener inserted through an anti-rotation flange of each slip plane bracket.

6. The vehicle front end of claim 5 wherein the slip plane bracket further comprises:
a body portion defining the clearance hole that is generated about a Y axis;
a ramp including a planar upper surface oriented to lie in an upper, forward and laterally outboard plane and having a bottom edge above a top surface of the body portion; and
a retainer flange having a lower edge spaced from and parallel to the bottom edge of the ramp that flexes toward and away from the bottom edge.

7. The vehicle front end of claim 6 wherein the retainer flange is attached to a riser flange by a living hinge that facilitates bending the retainer flange toward and away from the bottom edge of the ramp.

8. The vehicle front end of claim 6 wherein the planar upper surface of the ramp is oriented to face in an upwardly, forwardly and laterally outboard direction.

9. The vehicle front end of claim 6 wherein the anti-rotation flanges extend in a Y direction and a Z direction, and wherein the anti-rotation fasteners are self-tapping fasteners received by the anti-rotation flanges and are oriented to extend parallel to the Y axis.

10. The vehicle front end of claim 9 wherein the body portion, ramp, retainer flange and anti-rotation flange are a monolithic structure.

11. A method of assembling a front end sub-assembly for a vehicle comprising:
positioning a pair of headlamp modules proximate a bolster, wherein each headlamp module has a mounting tab;
assembling first and second slip plane brackets each including a ramp having a planar upper surface oriented to lie in an upper, forward and laterally outboard plane to first and second flanges each provided on one of the headlamp modules and adjusting a location of the slip plane brackets in a vertical plane, a longitudinal plane and a lateral plane to receive the mounting tab of the headlamp modules; and
fastening the slip plane brackets to the bolster with an alignment fastener and an anti-rotation fastener.

12. The method of claim 11 wherein the slip plane brackets each define an alignment hole, wherein the step of fastening the slip plane bracket to the bolster further comprises:
securing the alignment fastener in the alignment hole to fix a location of the slip plane bracket in the longitudinal plane and the lateral plane.

13. The method of claim 12 wherein the slip plane brackets each include an anti-rotation flange and the anti-rotation fastener is a self-tapping fastener, wherein the step of fastening the slip plane bracket to the bolster further comprises:
securing the anti-rotation flange to the bolster with the self-tapping fastener to prevent rotation of the slip plane bracket relative to the bolster.

14. The method of claim 11 wherein the slip plane brackets include a body portion defining a clearance hole generated about a Y axis, a ramp including a planar upper surface oriented to lie in an upper, forward and laterally outboard facing plane and having a bottom edge spaced above a top surface of the body portion, and a retainer flange having a lower edge spaced from and parallel to the bottom edge of the ramp that flexes toward and away from the bottom edge, wherein the step of assembling first and second slip plane brackets to first and second flanges each provided on one of the headlamp modules further comprises:
sliding the first and second flanges of the headlamp modules between the bottom edge of the ramp and the lower edge of the retainer flange of the slip plane brackets.

15. The method of claim 14 wherein the step of fastening the slip plane brackets further comprises:
securing the alignment fastener in an alignment hole to fix the location of the slip plane bracket in the longitudinal plane and the lateral plane.

16. The method of claim 15 wherein the step of fastening the slip plane brackets further comprises:
securing an anti-rotation flange to the bolster with the anti-rotation fastener to prevent rotation of the slip plane bracket relative to the bolster.

17. The method of claim 11 further comprising:
molding the slip plane brackets in one piece.

* * * * *